United States Patent
Wirfs-Brock et al.

(10) Patent No.: US 7,743,076 B2
(45) Date of Patent: Jun. 22, 2010

(54) EXTENSIBLE ACTION SEQUENCES COORDINATING INDEPENDENTLY CREATED COMPONENTS

(75) Inventors: Allen E. Wirfs-Brock, Kirkland, WA (US); Dmitry Goncharenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 11/698,562

(22) Filed: Jan. 26, 2007

(65) Prior Publication Data

US 2008/0184202 A1 Jul. 31, 2008

(51) Int. Cl.
*G06F 7/00* (2006.01)
*G06F 9/44* (2006.01)

(52) U.S. Cl. ................... 707/802; 717/117; 717/121

(58) Field of Classification Search .......... 707/101, 707/104.1, 802; 717/103, 117, 121
See application file for complete search history.

(56) References Cited

U.S. PATENT DOCUMENTS

| | | | | |
|---|---|---|---|---|
| 5,752,038 | A * | 5/1998 | Blake et al. ............... 717/158 |
| 6,205,465 | B1 * | 3/2001 | Schoening et al. ......... 718/102 |
| 6,317,738 | B1 | 11/2001 | Lohman et al. |
| 6,327,706 | B1 | 12/2001 | Amberg et al. |
| 6,594,783 | B1 | 7/2003 | Dollin et al. |
| 7,065,742 | B1 * | 6/2006 | Bogdan ..................... 717/106 |
| 7,099,868 | B1 * | 8/2006 | Turba et al. ..................... 1/1 |
| 7,216,332 | B2 * | 5/2007 | Smith ....................... 717/106 |
| 2003/0107597 | A1 * | 6/2003 | Jameson .................... 345/762 |
| 2004/0045013 | A1 | 3/2004 | Lam |
| 2004/0046789 | A1 * | 3/2004 | Inanoria .................... 345/748 |
| 2004/0078105 | A1 | 4/2004 | Moon et al. |
| 2004/0220927 | A1 * | 11/2004 | Murthy et al. ................. 707/4 |
| 2004/0226030 | A1 * | 11/2004 | Marvin et al. ............... 719/328 |
| 2005/0022161 | A1 * | 1/2005 | Burger et al. ............... 717/108 |
| 2005/0049906 | A1 | 3/2005 | Leymann et al. |
| 2005/0076344 | A1 | 4/2005 | Goring et al. |
| 2005/0155027 | A1 * | 7/2005 | Wei ........................... 717/162 |
| 2005/0246682 | A1 * | 11/2005 | Hines ........................ 717/109 |
| 2005/0278724 | A1 | 12/2005 | Buskens et al. |
| 2005/0289513 | A1 | 12/2005 | Chen et al. |
| 2006/0036392 | A1 * | 2/2006 | Fay ............................ 702/119 |

(Continued)

FOREIGN PATENT DOCUMENTS

WO WO0221269 3/2002

OTHER PUBLICATIONS

Ortigosa, Alvaro, et al., "Towards Agent-Oriented Assistance for Framework Instantiation", OOPSLA '00, Minneapolis, MN, Oct. 2000, pp. 253-264.*

(Continued)

*Primary Examiner*—Robert Stevens (57) ABSTRACT

Various technologies and techniques are disclosed for creating and executing extensible processes across multiple application components. A declarative feature is provided to allow partially ordered steps in an extensible process spanning multiple application components to be defined in a declarative format. A developer can define the minimum base steps in a first application component. Other application components can then provide additional partially ordered steps and/or actions to the extensible process. The declarative feature allows the partially ordered steps to have an associated step action. A sequencer is provided that assembles the partially ordered steps together from the multiple application components into a computational sequence having a total ordering. The sequencer executes the computational sequence in that total ordering upon receiving an execution request.

20 Claims, 14 Drawing Sheets

U.S. PATENT DOCUMENTS

| | | | |
|---|---|---|---|
| 2006/0048130 A1* | 3/2006 | Napier et al. | 717/168 |
| 2006/0074730 A1* | 4/2006 | Shukla et al. | 705/8 |
| 2006/0074734 A1* | 4/2006 | Shukla et al. | 705/8 |
| 2006/0074735 A1* | 4/2006 | Shukla et al. | 705/8 |
| 2006/0074736 A1* | 4/2006 | Shukla et al. | 705/8 |
| 2006/0080411 A1 | 4/2006 | Buskens et al. | |
| 2006/0089941 A1* | 4/2006 | Jenni et al. | 707/102 |
| 2007/0157167 A1* | 7/2007 | Brendle et al. | 717/120 |
| 2008/0066062 A1* | 3/2008 | Zatloukal et al. | 717/143 |
| 2008/0120617 A1* | 5/2008 | Keller et al. | 718/101 |
| 2009/0265705 A1* | 10/2009 | Wei | 717/176 |

OTHER PUBLICATIONS

Nau, Dana, et al., "Total-Order Planning with Partially Ordered Subtasks", IJCAI-2001, Seattle, WA, Aug. 2001, pp. 1-6.*

Karsai, Gabor, et al., "On the Use o Graph Transformation in the Formal Specification of Model Interpreters", Journal of Universal Computer Science, vol. 9, No. 11, Nov. 28, 2003, pp. 1296-1321.*

Selonen, Petri, et al., "Generating Structured Implementation Schemes from UML Sequence Diagrams", TOOLS 39, Jul. 29-Aug. 3, 2001, pp. 317-328.*

Nau, Dana, et al., "SHOP2: An HTN Planning System", Journal of Artificial Intelligence Research, vol. 20, © 2003, pp. 379-404.*

Ortigosa, Alvaro, et al., "SmartBooks: A Step Beyond Active-Cookbooks to Aid in Framework Instantiation", TOOLS 1999, Jun. 7-10, 1999, pp. 131-140.*

Autili, Marco, et al., "Synthesis of Concurrent and Distributed Adaptors for Component-Based Systems", EWSA 2006, Nantes, France, Sep. 4-5, 2006, pp. 17-32.*

Lee, Edward A., "What's Ahead for Embedded Software?", IEEE Computer, Sep. 2000, pp. 18-26.*

Gupta, Rajesh K., et al., "Synthesis and Simulation of Digital Systems Containing Interacting Hardware and Software Components", 29th ACM/IEEE Design Automation Conference, Anaheim, CA, © 1992, pp. 225-230.*

Moon, David A., "Object-Oriented Programming with Flavors", OOPSLA '86, Portland, OR, © 1986, pp. 1-8.*

Chan, "Semantic Checkpointing Framework for Enabling Runtime-Reconfigurable Applications", Date: Dec. 19, 2002, http://krs.lcs.mit.edu/regions/docs/chan-proposal.pdf.

Roshandel, et al., "Multi-View Software Component Modeling for Dependability", http://sunset.usc.edu/~rroshand/papers/DepBookCh.pdf, Jan. 26, 2007.

Vera, et al., "Event-Based Execution Architectures for Dynamic Software Systems", http://pavg.stanford.edu/cep/99wicsa1.ps.gz, Jan. 26, 2007.

* cited by examiner

```
[SequenceName("CoffeeMaker")]
[StepName("AddCoffee"), Order(After = Order.Begin)]
private void AddCoffee(CoffeeMakerContext context)
{
    if (context.Cancelled)
    {
        return;
    }
    context.ReportProgress();
    Console.WriteLine("{0}: Adding coffee ... ",
context.Progress);
}
```

FIG. 8

```
[SequenceName("CoffeeMaker")]
[StepName("AddWater"), Order(After = "AddCoffee")]
private void AddWater(CoffeeMakerContext context)
{
    context.ReportProgress();
    Console.WriteLine("{0}: Adding water ...",
context.Progress);
}
```

FIG. 9

```
[SequenceName("CoffeeMaker")]
[StepName("Brew"), Order(After = "AddWater")]
private void Brew(CoffeeMakerContext context)
{
    context.ReportProgress();
    Console.WriteLine("{0}: Brewing ...", context.Progress);
}
```

```
[SequenceName("CoffeeMaker")]
[ActionForStep(Before = "AddWater")]
private void
CheckWaterTemperature(CoffeeMakerContext context)
{
    if (IsWaterCold())
    {
        Console.WriteLine("ERROR: The water is not ready yet. Cancelling ...");
        context.Cancelled = true;
    }
}
```

```
[SequenceName("CoffeeMaker")]
[ActionForStep(After = "Brew")]
private void AddFlavor(CoffeeMakerContext context)
{
    Console.WriteLine(" :  Adding vanilla flavor .... ");
}
```

EXTENSIBLE ACTION SEQUENCES COORDINATING INDEPENDENTLY CREATED COMPONENTS

BACKGROUND

When writing software applications, developers typically write source code that specifies how the program should operate. Such source code typically specifies a predefined ordered sequence in which the computer should execute certain computational actions. These computational actions are typically implemented as a series of procedure calls to various methods or functions that perform certain operations. When an application is composed out of an unknown number of extensible application components, it is impossible for a programmer to write the exact series of procedure calls at the time when the source code is written. The reason this is impossible is because the exact list of available computational actions in the extensible application components and any ordering between them is unknown at the time of writing the source code.

SUMMARY

Various technologies and techniques are disclosed for creating and executing extensible processes across multiple application components. A declarative feature is provided to allow partially ordered steps in an extensible process spanning multiple application components to be defined in a declarative format. A developer of an application component can define the minimum base steps in a first application component using the declarative feature. Other application components can then provide additional partially ordered steps and/or computational actions to the extensible process using the declarative feature. The declarative feature also allows the partially ordered steps in these application components to have an associated step action.

A sequencer is provided that assembles the partially ordered steps together from the multiple application components into a computational sequence that has a total ordering that satisfies all of the assembled partial orderings. The sequencer executes the computational sequence in that total ordering upon receiving an execution request. The sequencer executes the computational sequence at runtime.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that allows creation of software application components, but the system also serves other purposes in addition to these. In one implementation, one or more of the techniques described herein can be implemented as features within a software development program such as MICROSOFT® VISUAL STUDIO®, or from any other type of program or service that allows for one or more portions of software to be developed.

In one implementation, a sequencing system is provided that allows for independently developed software application components to be created with partially ordered steps using a declarative format. The term "declarative format" as used herein means a format which describes an intended result rather than a method for achieving that result. The partially ordered steps are then assembled together by a sequencer at runtime into an execution order. The term "partially ordered steps" as used herein is meant to include steps that have an order specified relative to one or more of the other known steps. In one implementation, portions of the same extensible process are created as partially ordered steps by different individuals and/or companies who are not aware of the exact execution order, and then those parts are brought together by the sequencer and assembled into the exact execution order. By using some or all of the technologies and techniques discussed herein, a given application can thus operate with one or more extensible processes written by one or more people.

Figure 1:
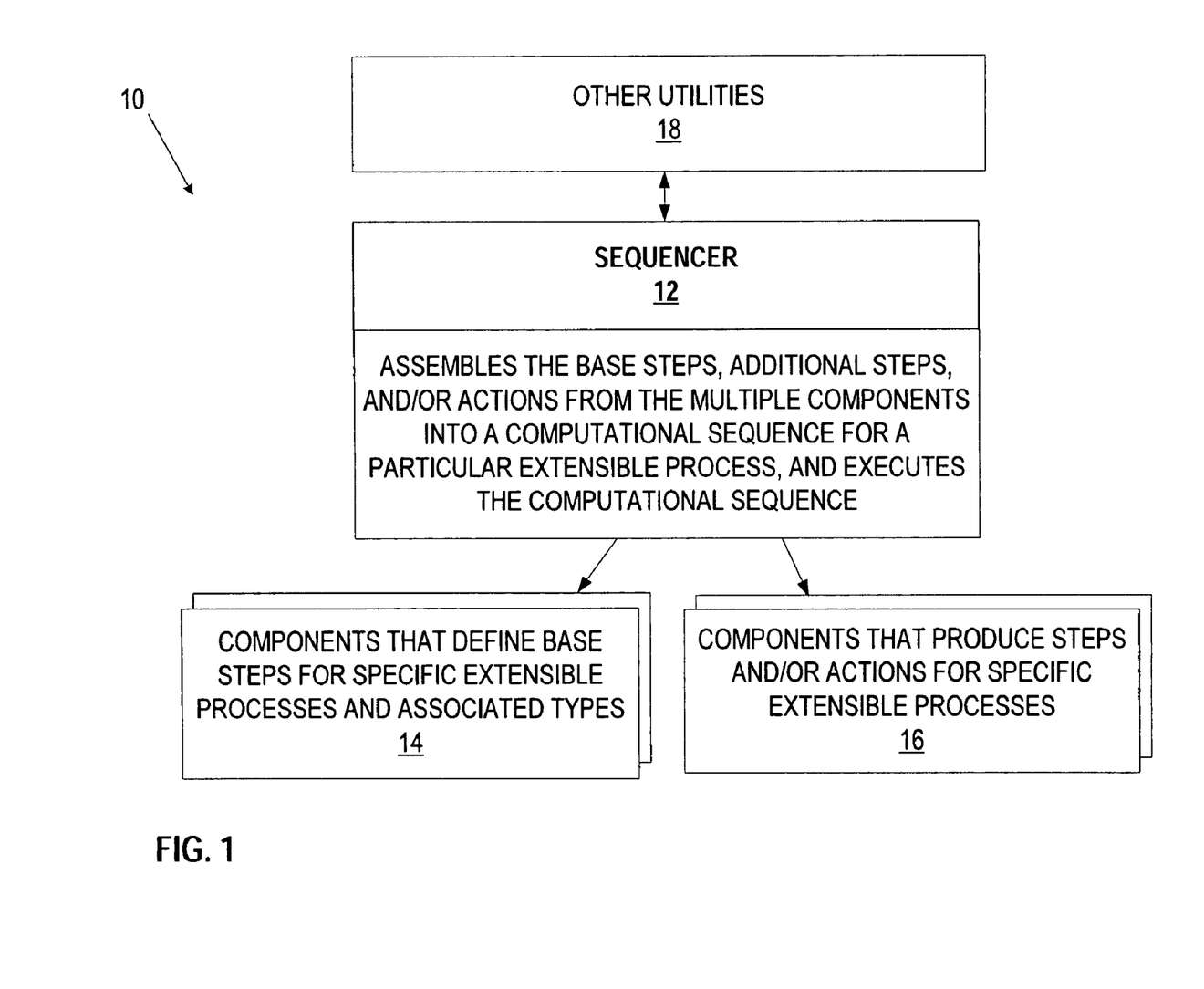
FIG. 1 is a diagrammatic view of the components of a sequencing system of one implementation.

FIG. 1 is diagrammatic view of the components of a sequencing system 10 of one implementation. Sequencing system 10 includes a sequencer 12, components defining base steps 14, components producing additional steps and/or actions 16, and other utilities 18 for implementing the sequencer system 10. One or more components are provided that define the minimum base steps for specific extensible processes and their associated types 14. One or more components are provided that produce additional steps and/or actions for the specific extensible processes 16. The sequencer 12 then assembles the base steps, additional steps, and/or actions from the multiple components (14 and 16) into a computational sequence for a particular process, and executes that computational sequence. In one implementation, the sequencer 12 assembles and executes this computational sequence at runtime. In another implementation, the sequencer 12 assembles this computational sequence prior to runtime and then executes it at runtime. Other utilities 16 are optionally used by the sequencer 12 as desired.

Figure 2:
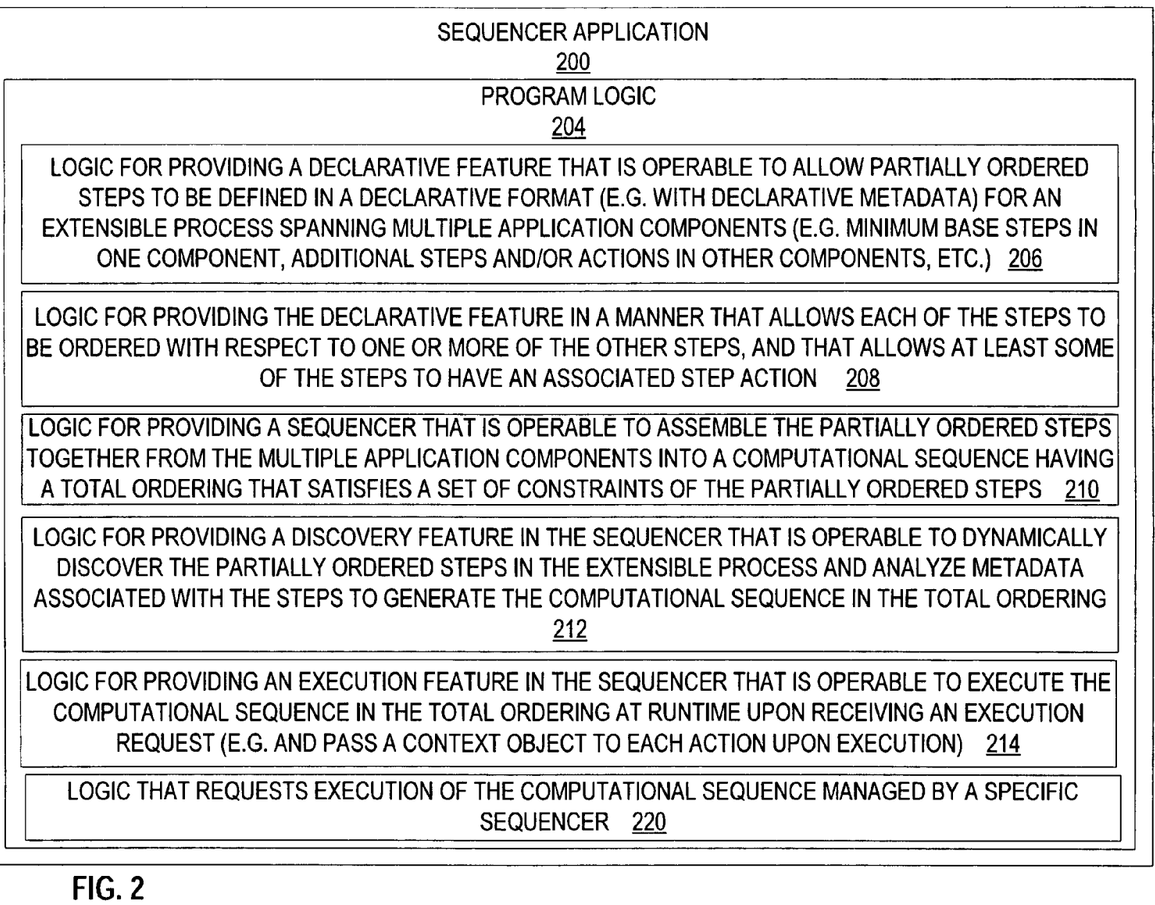
FIG. 2 is a diagrammatic view of a sequencer application of one implementation that implements some or all of the features of sequencing system of FIG. 1.

Turning now to FIG. 2 with continued reference to FIG. 1, a sequencer application 200 is illustrated. Sequencer application 200 is one of the application programs that reside on computing device 600 (of FIG. 14). However, it will be understood that sequencer application 200 can alternatively or additionally be embodied as computer-executable instructions on one or more computers and/or in different variations than shown on FIG. 14. Alternatively or additionally, one or more parts of sequencer application 200 can be part of system memory 604 (of FIG. 14), on other computers and/or applications 615 (of FIG. 14), or other such variations as would occur to one in the computer software art.

Sequencer application 200 includes program logic 204, which is responsible for carrying out some or all of the techniques described herein. Program logic 204 includes logic for providing a declarative feature that is operable to allow partially ordered steps to be defined in a declarative format (e.g. with declarative metadata) for an extensible process spanning multiple application components (e.g. minimum base steps in one component, additional steps and/or actions in other components, etc.) 206; logic for providing the declarative feature in a manner that allows each of the steps to be ordered with respect to one or more of the other steps, and that allows at least some of the steps to have an associated step action 208; logic for providing a sequencer that is operable to assemble the partially ordered steps together from the multiple application components into a computational sequence having a total ordering that satisfies a set of constraints of the partially ordered steps 210; logic for providing a discovery feature in the sequencer that is operable to dynamically discover the partially ordered steps in the extensible process and analyze metadata associated with the steps to generate the computational sequence in the total ordering 212; logic for providing an execution feature in the sequencer that is operable to execute the computational sequence in the total ordering (e.g. at runtime) upon receiving an execution request (e.g. and pass a context object to each action upon execution) 214; and logic that requests execution of the computational sequence managed by a specific sequencer 220. In one implementation, program logic 204 is operable to be called programmatically from another program, such as using a single call to a procedure in program logic 204.

Figure 3:
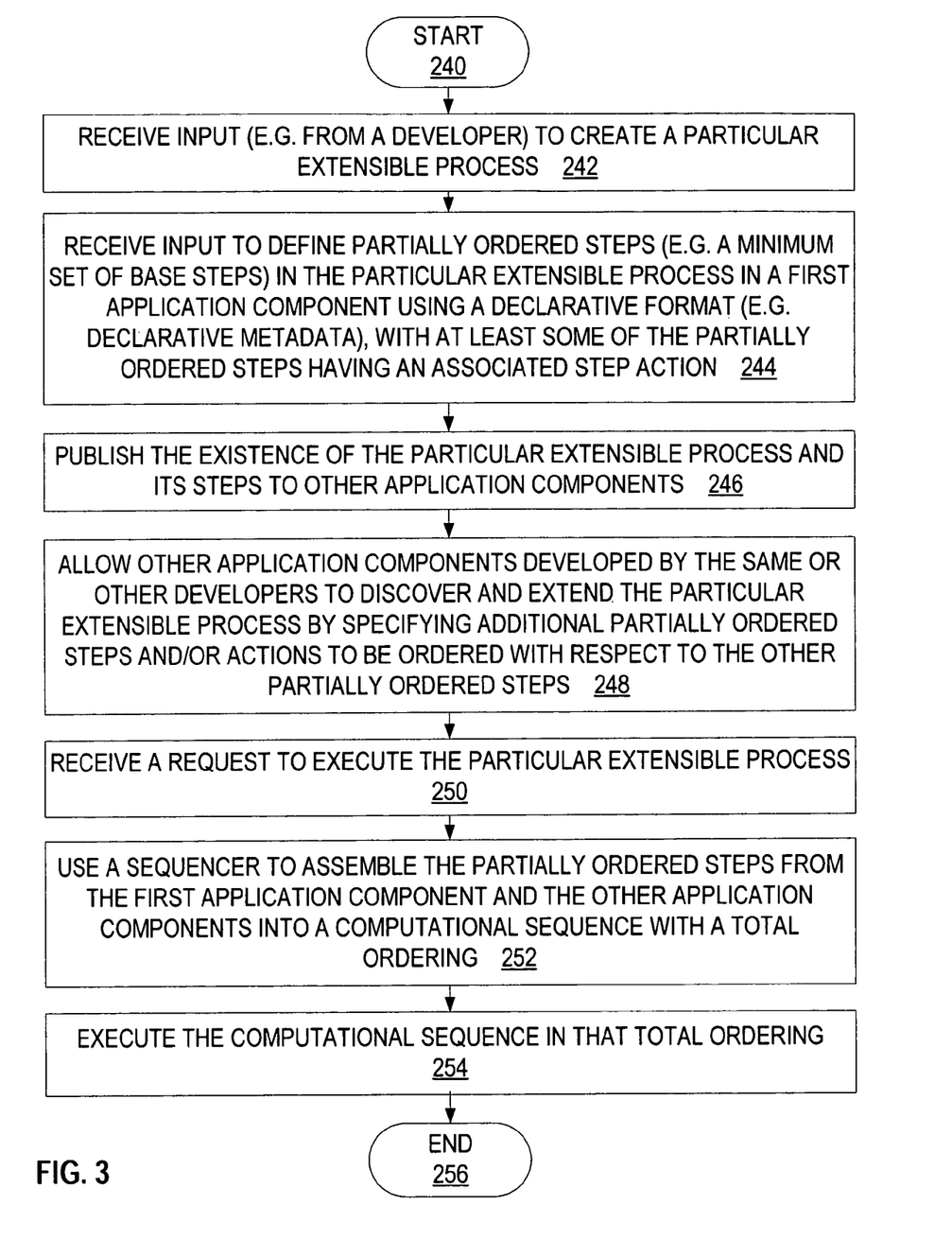
FIG. 3 is a high-level process flow diagram for one implementation of the system of FIG. 1.

Turning now to FIGS. 3-6 with continued reference to FIGS. 1-2, the stages for implementing one or more implementations of sequencer system 10 and/or sequencer application 200 are described in further detail. FIG. 3 is a high level process flow diagram for sequencer system 10. In one form, the process of FIG. 3 is at least partially implemented in the operating logic of computing device 600 (of FIG. 14). The procedure begins at start point 240 with receiving input from a developer to create a particular extensible process (stage 242). Input is received to define partially ordered steps (e.g. a minimum set of base steps) in the particular extensible process in a first application component using a declarative format (e.g. declarative metadata) (stage 244). In one implementation, at least some of the partially ordered steps have an associated step action (stage 244). The existence of the particular extensible process and its steps are published/made available to other application components (stage 246). Other application components developed by the same or other developers can discover and extend the particular extensible process by specifying additional partially ordered steps and/or or actions to be ordered with respect to the other partially ordered steps (stage 248). A request is received to execute the particular extensible process (stage 250). A sequencer assembles the partially ordered steps from the first application component and the other application components into a computational sequence with a total ordering (stage 252). The sequencer then executes the computational sequence in that total ordering (stage 254). The process ends at end point 256.

Figure 4:
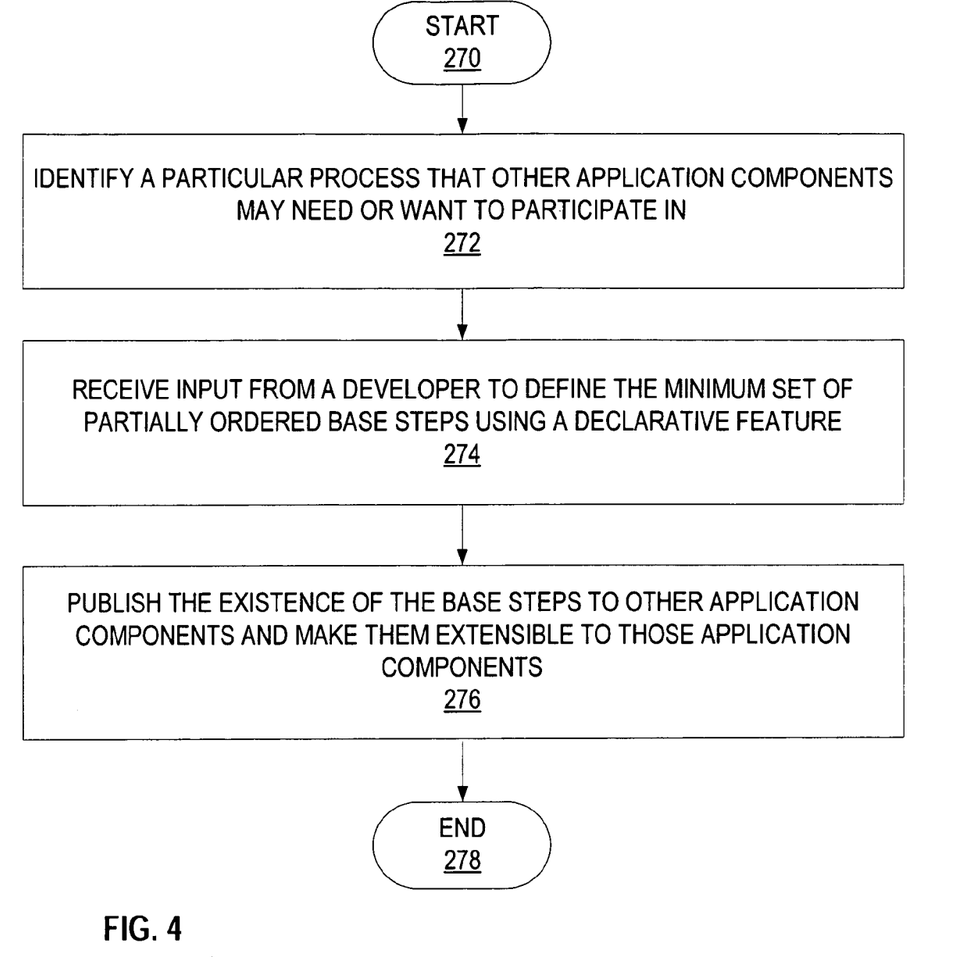
FIG. 4 is a process flow diagram for one implementation of the system of FIG. 1 illustrating the stages involved in creating the minimum base steps for an extensible process.

FIG. 4 illustrates one implementation of the stages involved in creating the minimum base steps for an extensible process in a first application component. In one form, the process of FIG. 4 is at least partially implemented in the operating logic of computing device 600 (of FIG. 14). The procedure begins at start point 270 with identifying a particular process that other application components may need or want to participate in (stage 272). Input is received from a developer to define the minimum set of partially ordered base steps using a declarative feature (stage 274). The existence of the base steps is published/made available to other application components to make them extensible to those application components (stage 276). The partial ordering specification of the base steps is also published. The process ends at end point 278.

Figure 5:
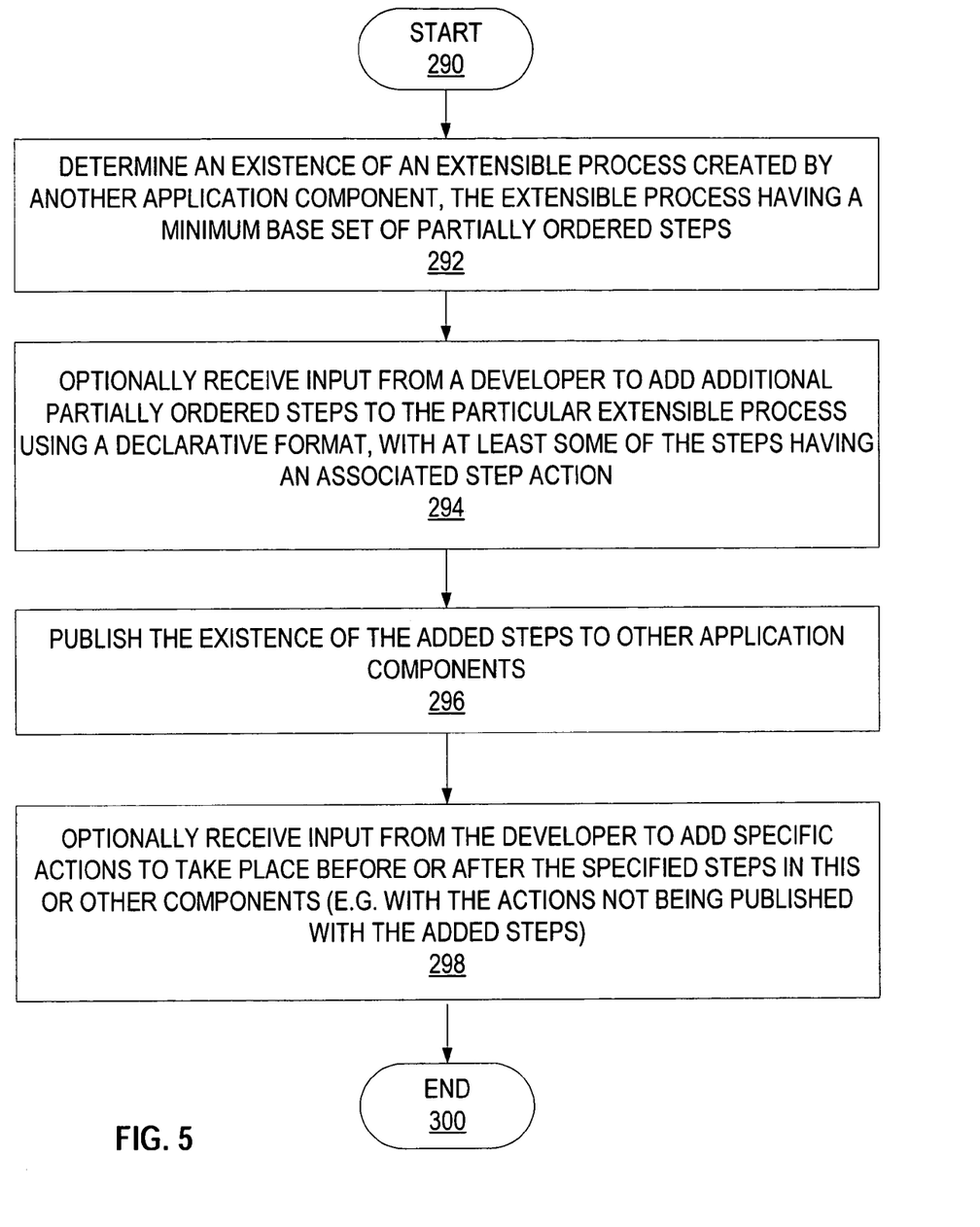
FIG. 5 is a process flow diagram for one implementation of the system of FIG. 1 illustrating the stages involved in adding additional steps and/or actions to the minimum base steps for an extensible process from a separate application component.

FIG. 5 illustrates one implementation of the stages involved in adding additional steps and/or actions to the minimum base steps for an extensible process from a separate application component. In one form, the process of FIG. 5 is at least partially implemented in the operating logic of computing device 600 (of FIG. 14). The procedure begins at start point 290 with determining an existence of an extensible process created by another application component, the extensible process having a minimum base set of partially ordered steps (stage 292). The system optionally receives input from a developer to add additional steps to the particular extensible process using a declarative format, with at least some of the steps having an associated step action (stage 294). The existence of the added steps is published/made available to other application components (stage 296). The system optionally receives input from the developer to add specific actions to take place before or after the specified steps in this or other components (stage 298). In one implementation, the existence of the before/after actions is not published with the added steps, so other components are not aware that the actions exist (stage 298). The process ends at end point 300.

Figure 6:
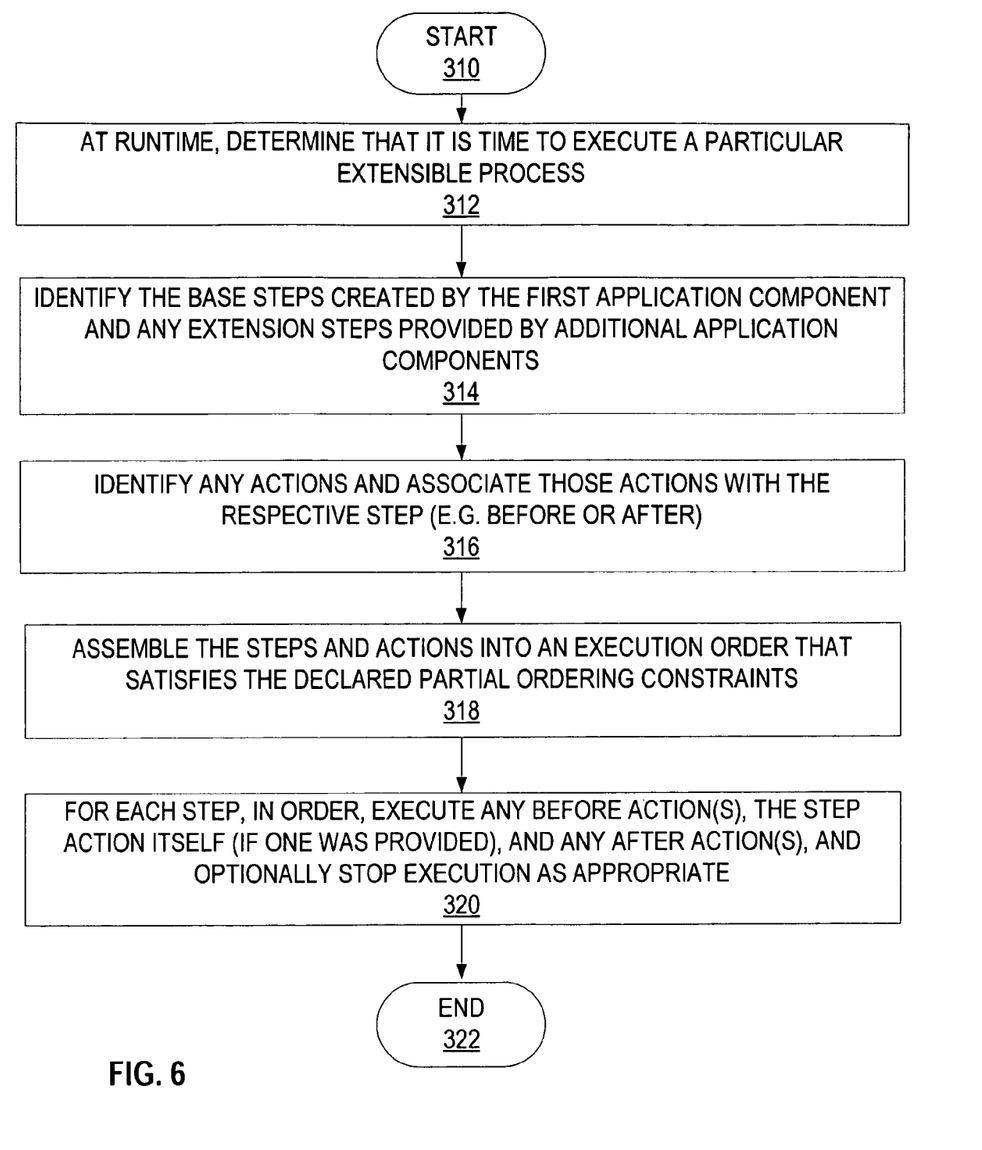
FIG. 6 is a process flow diagram for one implementation of the system of FIG. 1 illustrating the stages involved in providing a sequencer to assemble and execute the steps and actions from the multiple components.

FIG. 6 illustrates one implementation of the stages involved in providing a sequencer to assemble and execute the steps and actions from the multiple components. In one form, the process of FIG. 6 is at least partially implemented in the operating logic of computing device 600 (of FIG. 14). The procedure begins at start point 310 with determining at runtime that it is time to execute a particular extensible process (stage 312). The base steps created by the first application components and any extension steps provided by additional application components are identified (stage 314). The system then identifies any actions and associate those actions with the respective step (e.g. before or after) (stage 316). The sequencer assembles the steps and actions into an execution order that satisfies the declared partial ordering constraints (stage 318). For each step, the sequencer executes, in order, any before action(s), the step action itself (if one was provided), and any after action(s) (stage 320). In one implementation, the sequencer passes a context object to each action (e.g. step action and/or before/after action) when it executes the action. The context object allows information to be passed among the actions as they are executed and allows the actions to make requests to the sequencer such as to terminate execution of the steps and actions before reaching the end of the complete computational sequence.

In one implementation, the execution can be potentially stopped (cancelled, prematurely completed, considered failed, etc) if the execution context provides facilities for doing so (stage 320). The process ends at end point 322.

Figure 7:
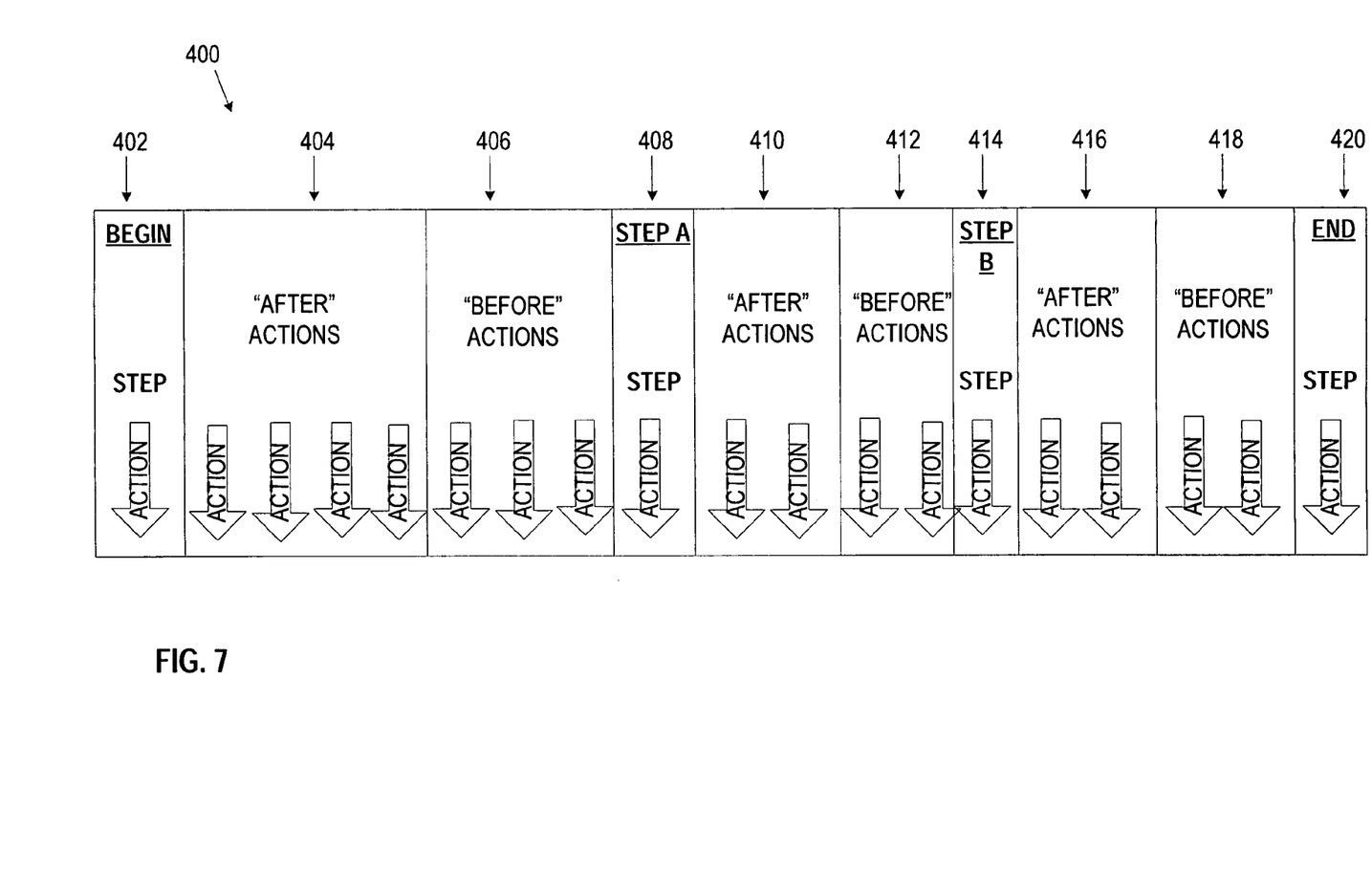
FIG. 7 is a logical diagram for one implementation of the system of FIG. 1 that illustrates a hypothetical execution sequence of an extensible process.

Shown in FIG. 7 is a hypothetical execution sequence 400 for an extensible process that was assembled in a total ordering as described in FIG. 6. A Begin Step 402 is executed, along with any "after actions" 404 for the Begin Step. Any "before actions" 406 for Step A are then executed, along with Step A itself 408, and any "after actions" 410 for Step A. Similarly, any "before actions" 412 for Step B are then executed, along with Step B itself 414, and any "after actions" 416 for Step B. Any "before actions" 418 for the End Step are then executed, along with the End Step itself 420.

Figure 8:
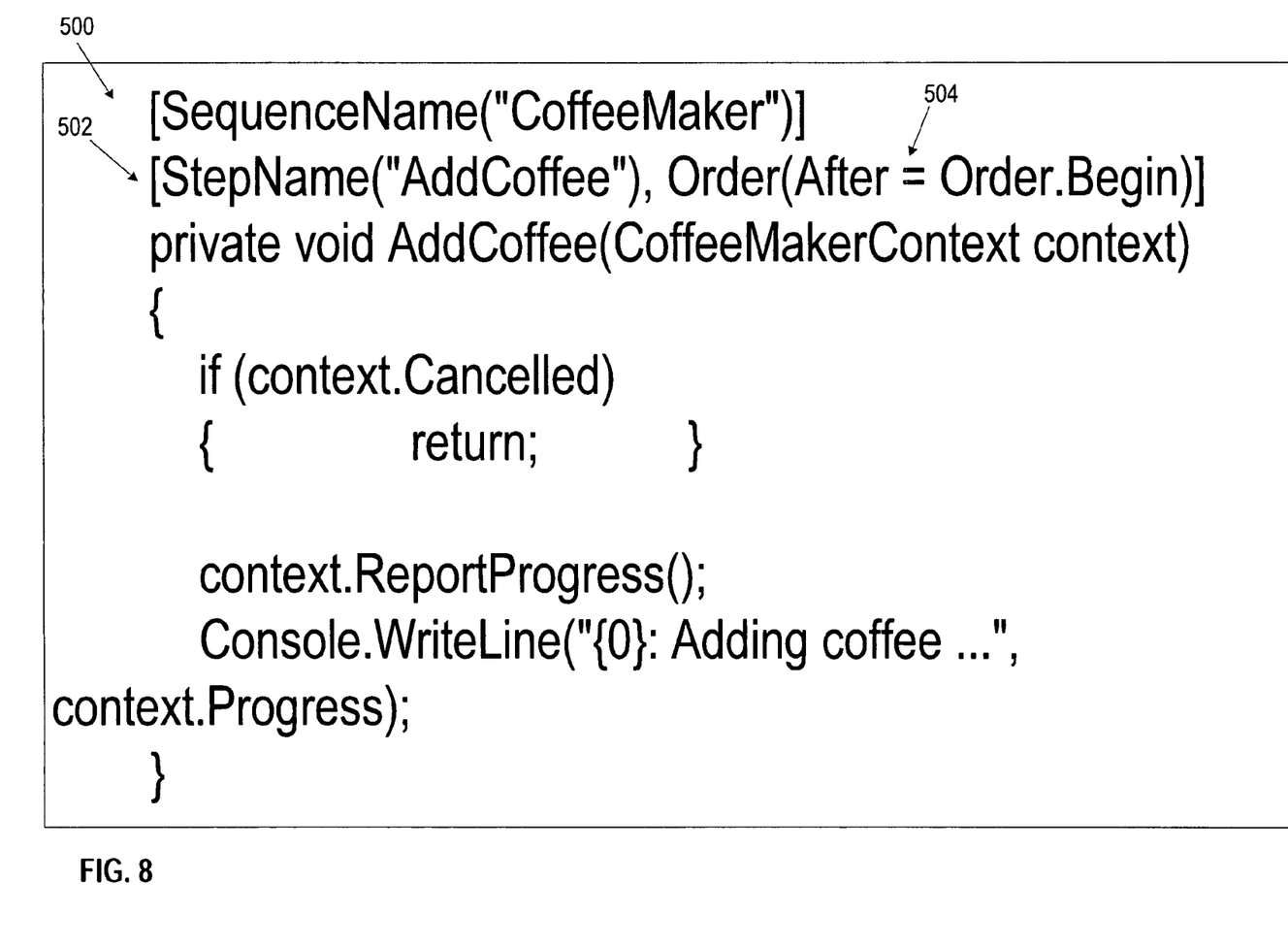
FIGS. 8-12 are diagrams illustrate exemplary source code for a hypothetical extensible process for making coffee, with some of the source code being contained across multiple application components.
Figure 9:
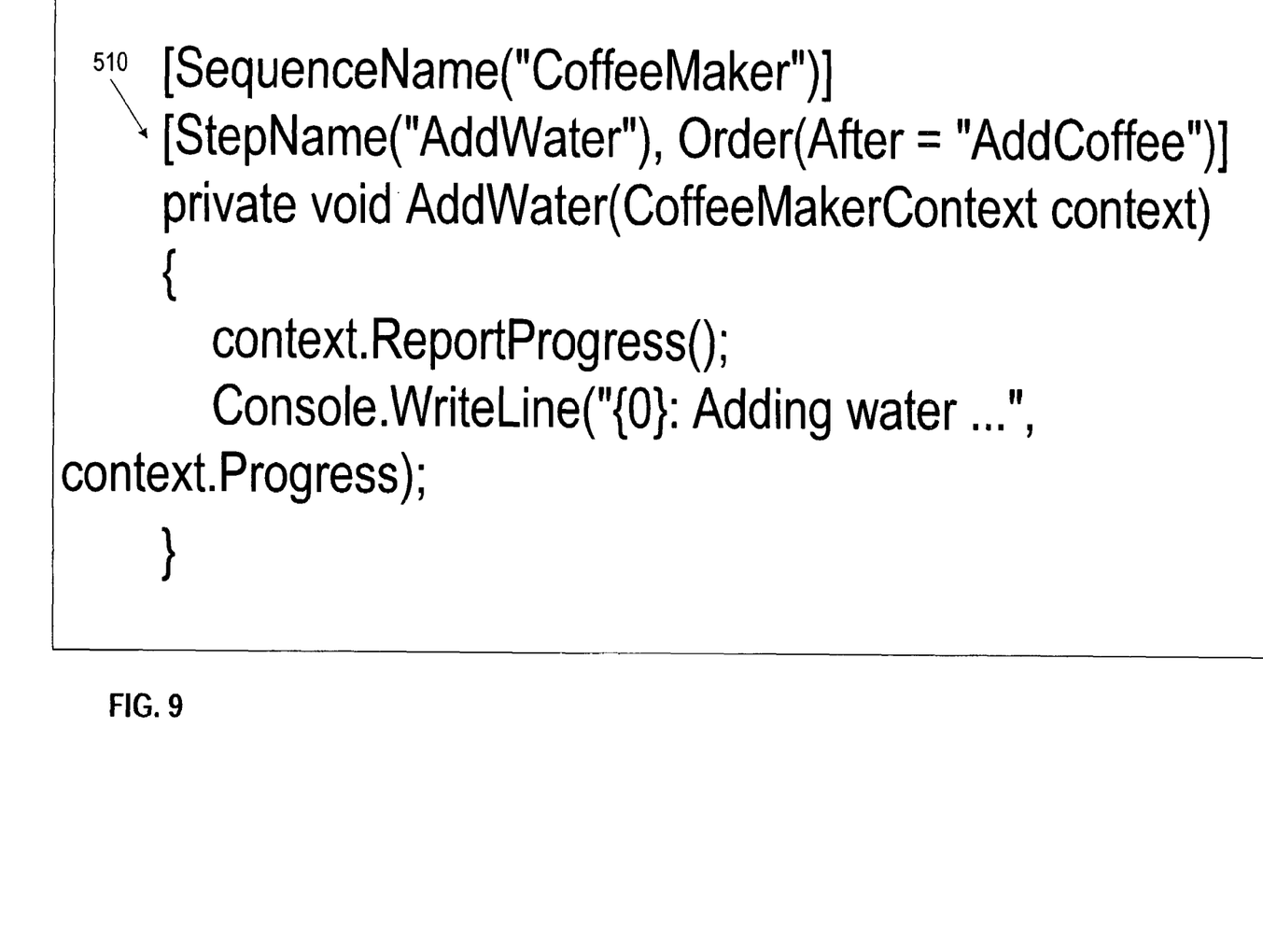
Figure 10:
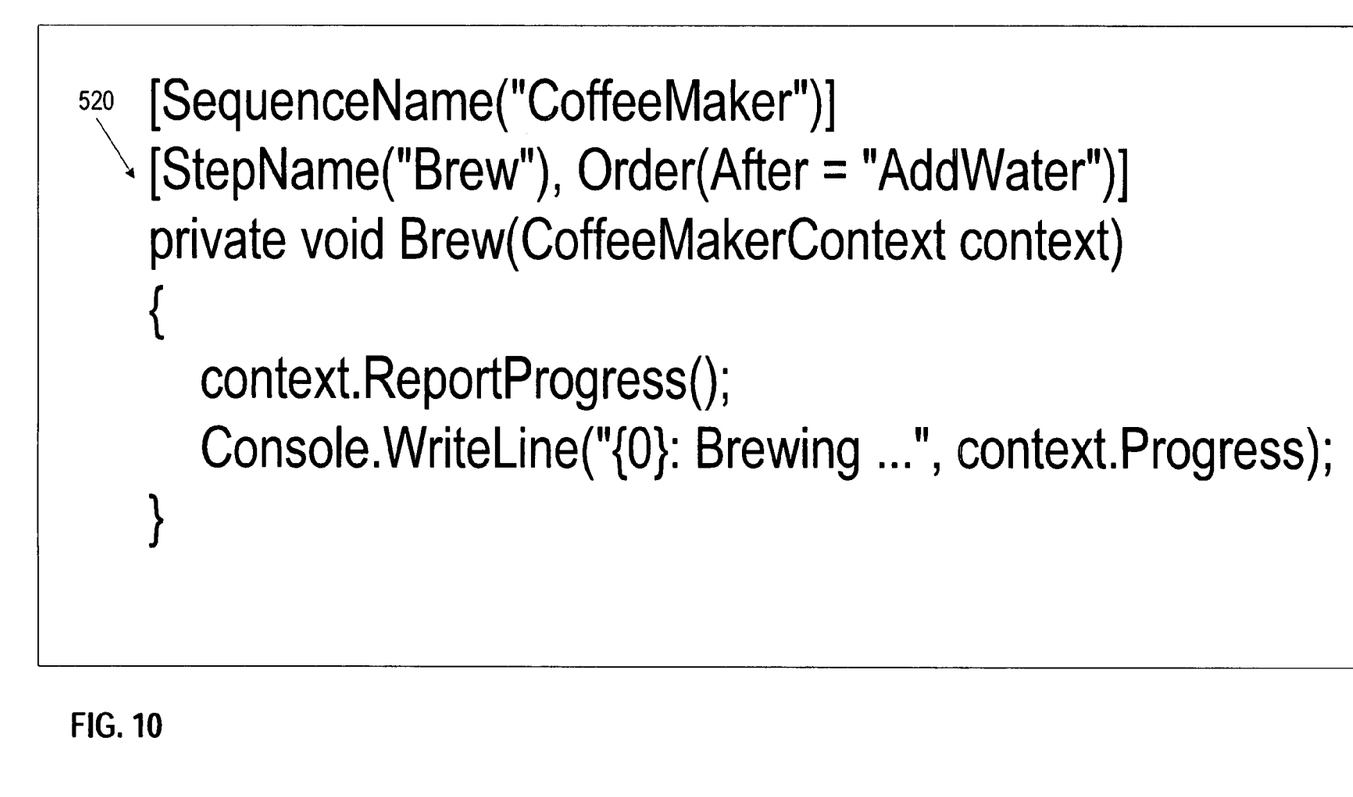
Figure 11:
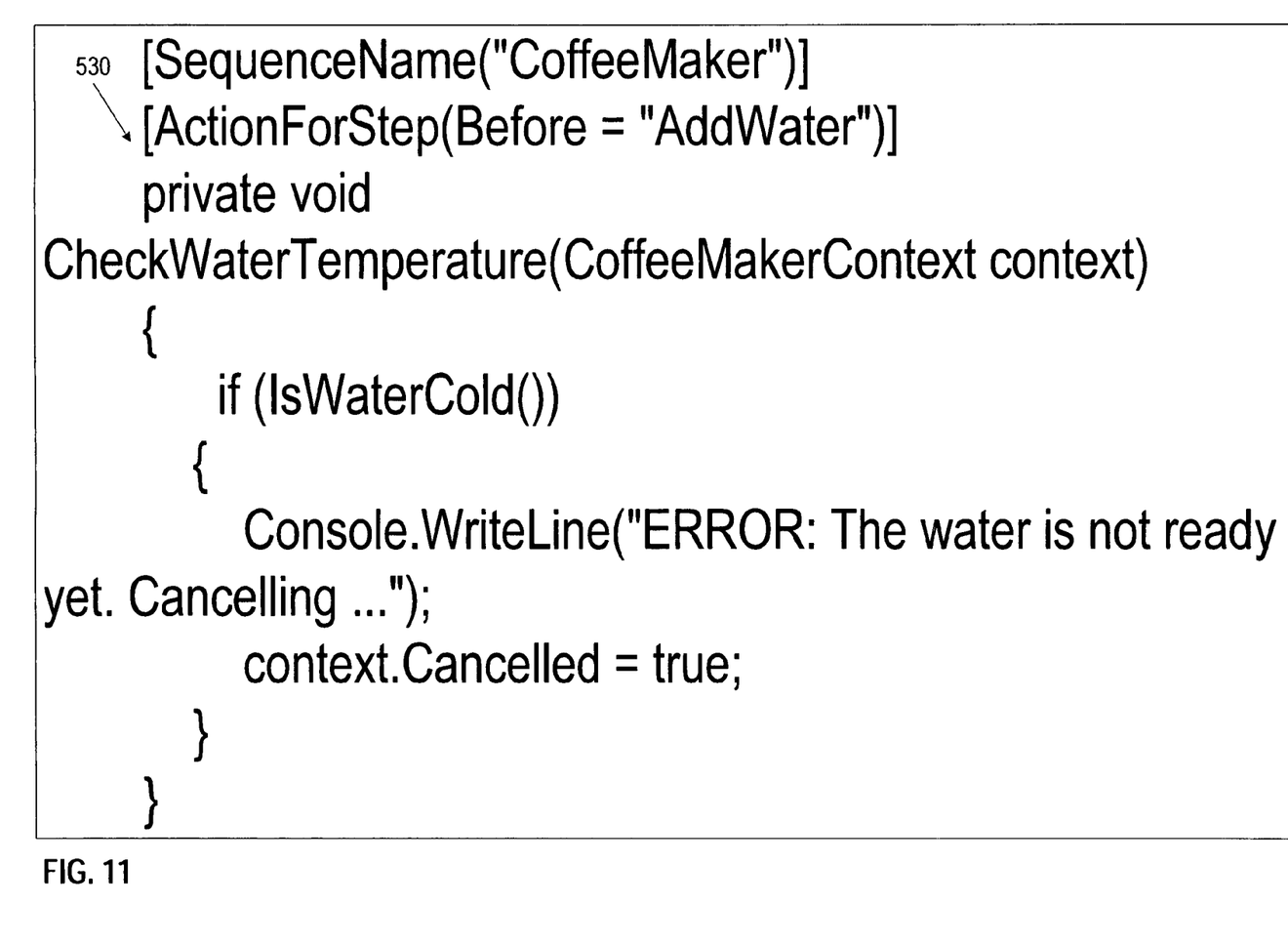
Figure 12:
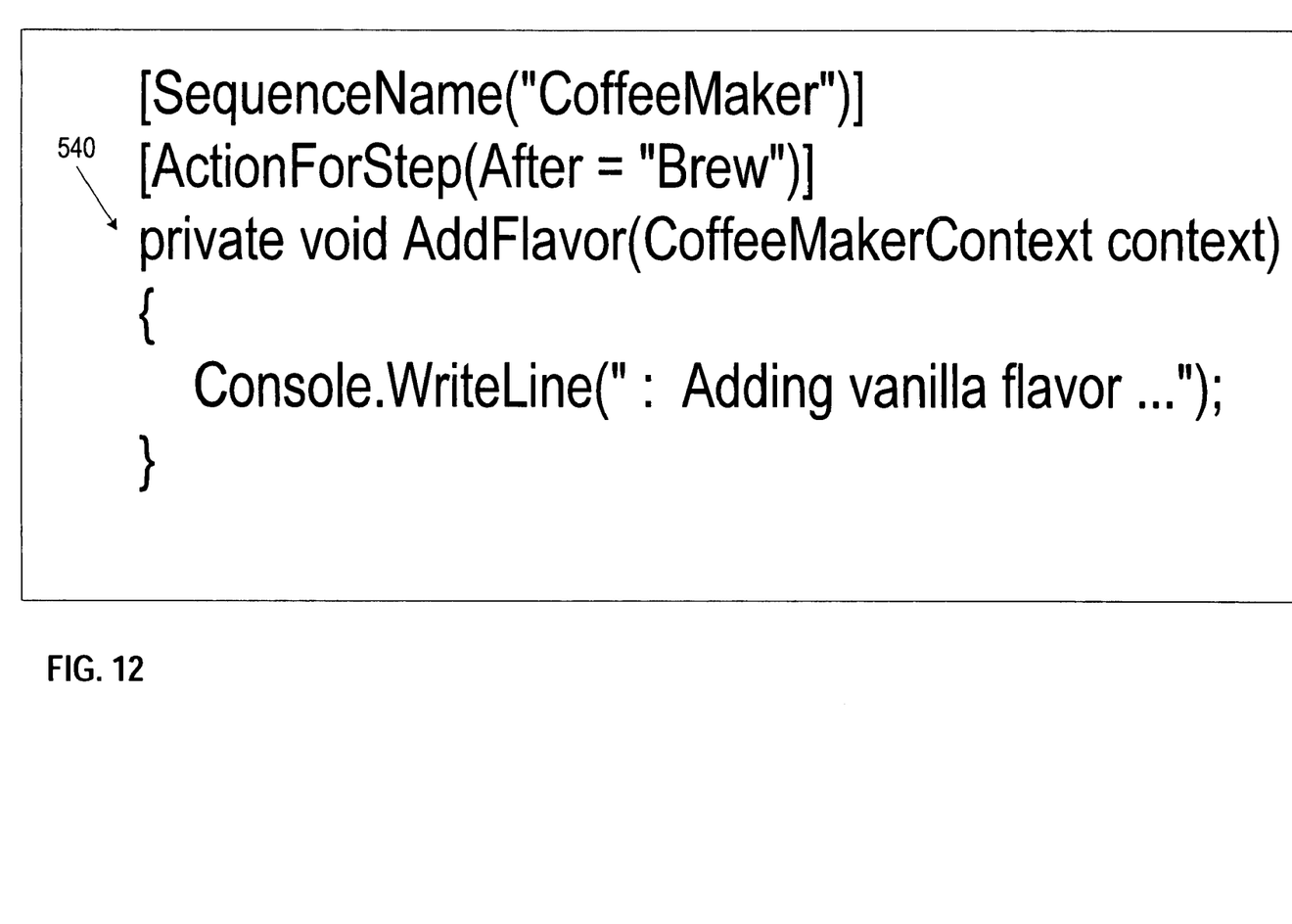

FIGS. 8-12 are diagrams illustrate exemplary source code for a hypothetical extensible process for making coffee, with some of the source code being contained across multiple application components. FIG. 8 shows some exemplary source code for an extensible process for making coffee. The source code is written with metadata (such as attributes) that use a declarative format. The sequence for the step to participate in is specified, which in this case is "CoffeeMaker" 500. The name of the particular step 502 being created is specified (e.g. "AddCoffee"), along with the partial ordering details 504 that indicate what known step this step should come before or after (e.g. after the Begin Step). In one implementation, the step action that is associated with the step is specified by the definition of the procedure named "AddCoffee". FIGS. 9-12 illustrate further steps and/or actions in the coffee making process (e.g. the "CoffeeMaker" sequence). FIG. 9, for example, illustrates an "AddWater" step 510 that should come after the "AddCoffee" step. FIG. 10 illustrates a "Brew" step 520 that should come after the "AddWater" step. FIG. 11 illustrates an action called "CheckWaterTemperature" 530 for the "AddWater" step that should come immediately before "AddWater". FIG. 12 illustrates an action called "AddFlavor" 540 that should come immediately after the "Brew" step.

Figure 13:
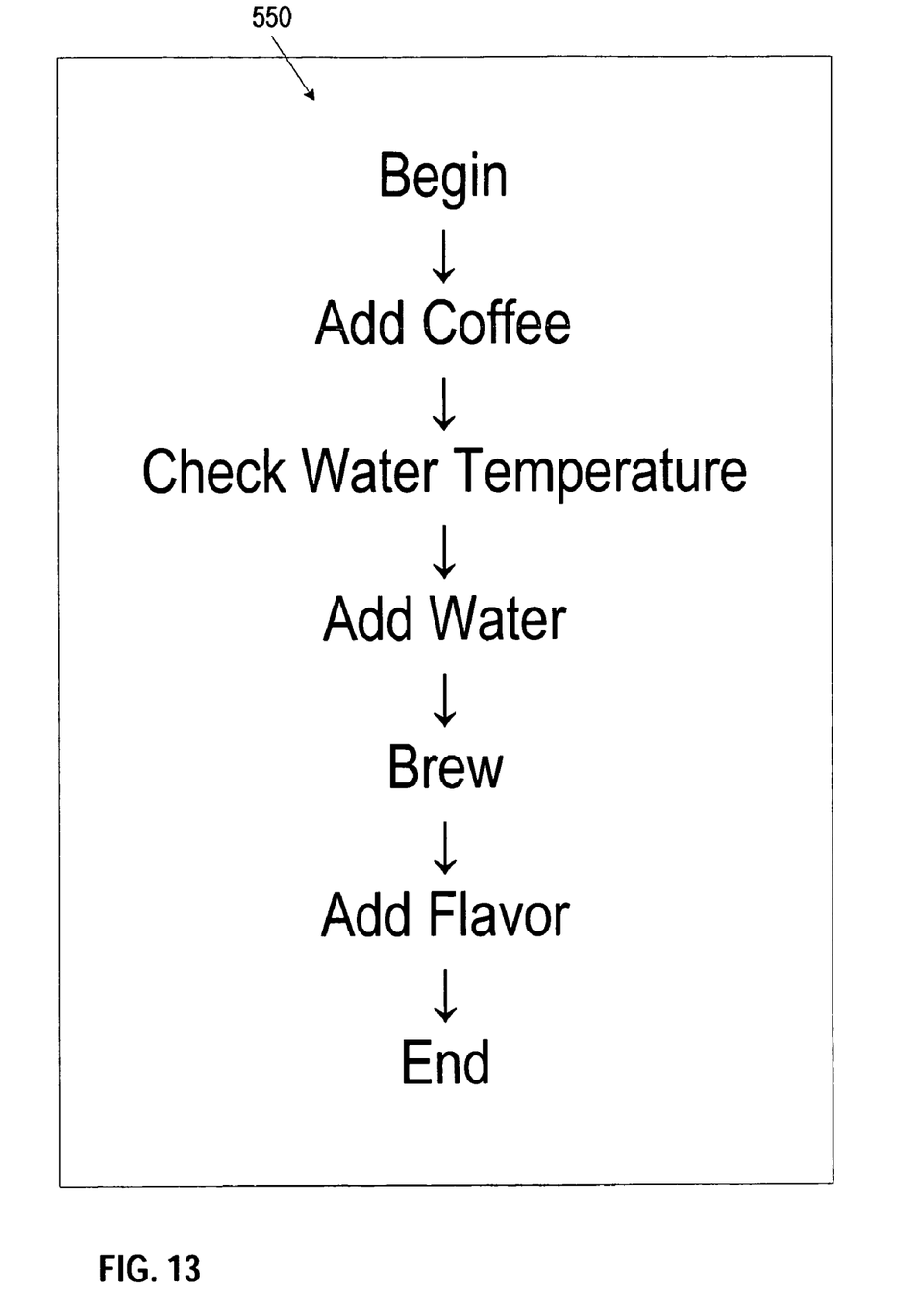
FIG. 13 is a diagram that illustrates an ordered list of computational sequences compiled by the sequencer from analyzing the hypothetical extensible process for making coffee illustrated in FIGS. 8-12.

In one implementation, the steps defined in FIGS. 8-10 are the base steps that are defined in a first application component, and the actions shown in FIGS. 11 and 12 are defined in one or more other application components to extend the base steps. Other variations are also possible. When the sequencer receives a request to execute the coffee making sequence, the metadata is analyzed to determine the order in which to execute the steps. The total ordering for the computational sequence for making coffee is then generated 550, as shown in FIG. 13. The sequencer can then execute the steps in that total ordering to perform a completely ordered coffee making process.

Figure 14:
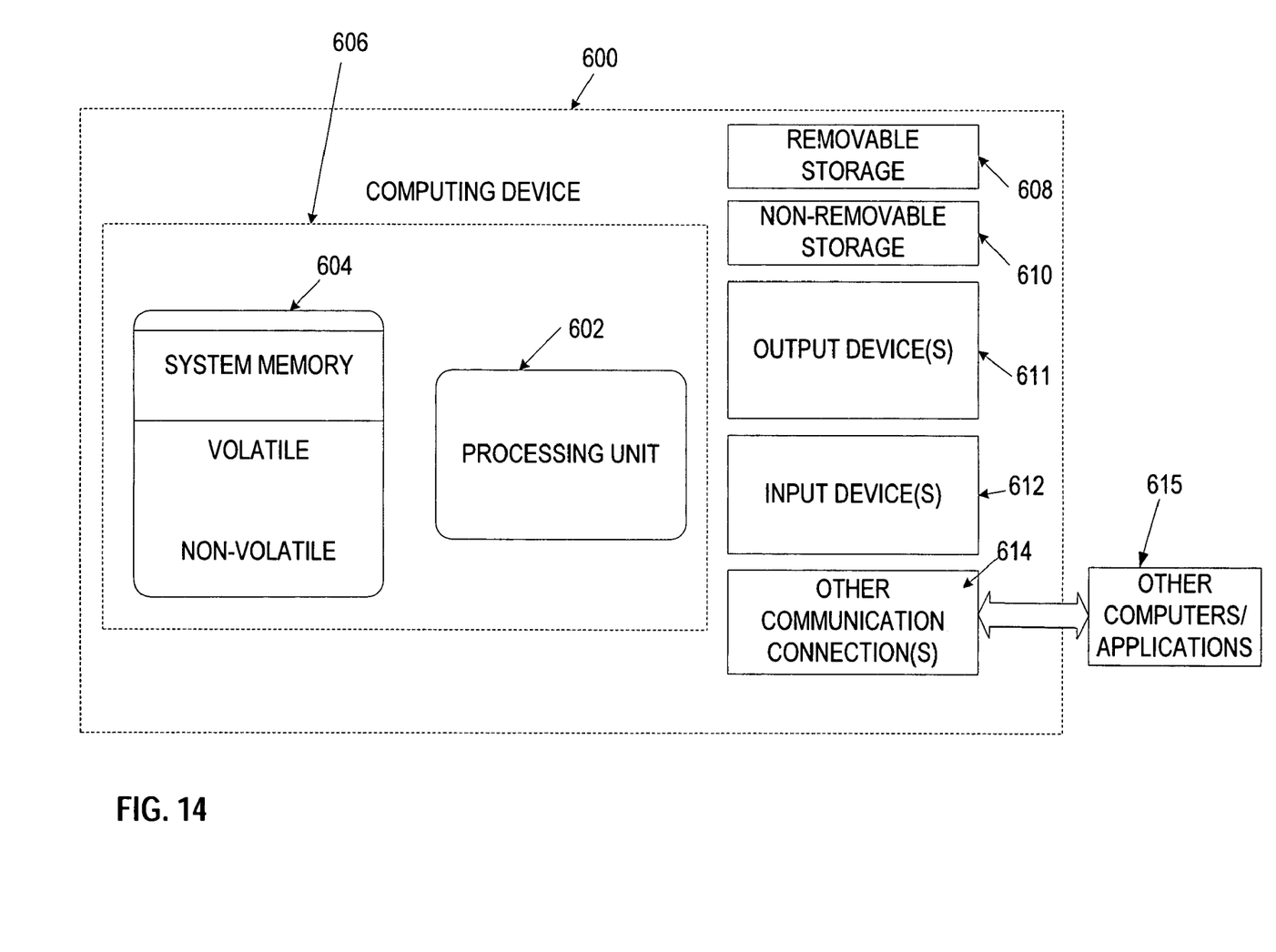
FIG. 14 is a diagrammatic view of a computer system of one implementation.

As shown in FIG. 14, an exemplary computer system to use for implementing one or more parts of the system includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 14 by dashed line 606.

Additionally, device 600 may also have additional features/functionality. For example, device 600 may also include additional storage (removable and/or non-removable) including, but not limited to, magnetic or optical disks or tape. Such additional storage is illustrated in FIG. 14 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here. In one implementation, computing device 600 includes sequencer application 200.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A computer storage media having computer-executable instructions for causing a computer to perform steps comprising:

provide a declarative feature that is operable to allow a first plurality of partially ordered steps in an extensible process spanning multiple application components to be defined in a declarative format, the declarative feature allowing at least some of the partially ordered steps to have an associated step action, the first plurality of partially ordered steps including a step having an order specified relative to at least one other step of the first plurality of partially ordered steps;

publish the existence of the first plurality of partially ordered steps to other application components;

receive a second plurality of partially ordered steps from at least one of the other application components as a result of said publishing; and provide a sequencer that is operable to assemble the first plurality of partially ordered steps and the second plurality of partially ordered steps into a computational sequence having a total ordering, and to execute the computational sequence in the total ordering upon receiving an execution request.

2. The computer storage media of claim 1, wherein the declarative feature is operable to allow the first plurality of partially ordered steps to be defined using declarative metadata.

3. The computer storage media of claim 1, wherein the sequencer is operable to pass a context object to each of the associated step actions upon execution.

4. The computer storage media of claim 1, wherein the sequencer is operable to receive an execution request at runtime.

5. The computer storage media of claim 1, wherein the sequencer is operable to dynamically discover the first plurality of partially ordered steps in the extensible process.

6. The computer storage media of claim 5, wherein the sequencer is further operable to analyze metadata associated with the first and second pluralities of partially ordered steps to generate the computational sequence in a total ordering that satisfies a set of constraints of the first and second pluralities of partially ordered steps.

7. The computer storage media of claim 1, wherein the declarative feature is operable to allow a separate application component to define one or more additional partially ordered steps.

8. The computer storage media of claim 1, wherein the declarative feature is operable to allow a separate application component to define specific actions that should occur before or after a particular one of the first plurality of partially ordered steps.

9. The computer storage media of claim 1, wherein the declarative feature is operable to allow at least some of the first plurality of partially ordered steps to be declared in a first application component as a minimum set of steps to be performed by the extensible process.

10. A method for creating an extensible process across application components comprising the steps of:
   receiving input from a developer to define a first plurality of partially ordered steps in an extensible process in a first application component, the partially ordered steps being defined using a declarative format, with at least some of the partially ordered steps having an associated step action, the first plurality of partially ordered steps including a step having an order specified relative to at least one other step of the first plurality of partially ordered steps;
   publishing the existence of the first plurality of partially ordered steps to other application components;
   receiving a second plurality of partially ordered steps from at least one of the other application components as a result of said publishing; and
   assembling the second plurality of partially ordered steps with the first plurality of partially ordered steps in the extensible process to have a total ordering.

11. The method of claim 10, wherein the first plurality of partially ordered steps is a minimum set of steps to be performed by the extensible process.

12. The method of claim 10, further comprising:
   receiving input from a same or different developer to define at least one additional partially ordered step to the extensible process in a second application component.

13. The method of claim 10, further comprising:
   providing a sequencer that is operable to assemble the first and second pluralities of partially ordered steps together into a computational sequence having a total ordering, and to execute the computational sequence in that total ordering upon receiving an execution request.

14. The method of claim 13, wherein the sequencer is operable to assemble the first and second pluralities of partially ordered steps along with additional partially ordered steps from one or more additional application components into the computational sequence.

15. The method of claim 10, wherein the declarative format allows the first and second pluralities of partially ordered steps to be defined using declarative metadata.

16. A computer storage media having computer-executable instructions for causing a computer to perform the steps recited in claim 10.

17. A method for extending a process created by an application component comprising the steps of:
   determining an existence of an extensible process created by an application component, the extensible process having an original set of partially ordered steps;
   receiving input from a developer to add one or more additional partially ordered steps to the extensible process, the additional partially ordered steps being added using a declarative format, with at least some of the additional partially ordered steps having an associated step action, the additional partially ordered steps including a step having an order specified relative to at least one other step;
   publishing the existence of the one or more additional partially ordered steps; and
   receiving a subsequent set of partially ordered steps from at least one other application component as a result of said publishing;
   wherein the original set of partially ordered steps, the one or more additional partially ordered steps, and the subsequent set of partially ordered steps are assembled in the extensible process to have a total ordering.

18. The method of claim 17, further comprising:
   receiving input from the developer to define at least one specific action that should occur before or after a particular one of the additional partially ordered steps or the original set of partially ordered steps.

19. The method of claim 18, wherein the at least one specific action is not published with the existence of the one or more additional partially ordered steps.

20. A computer storage media having computer-executable instructions for causing a computer to perform the steps recited in claim 17.

* * * * *